Jan. 13, 1970  F. HALEY  3,489,434
PIPE COUPLING
Filed Sept. 26, 1966  4 Sheets-Sheet 1
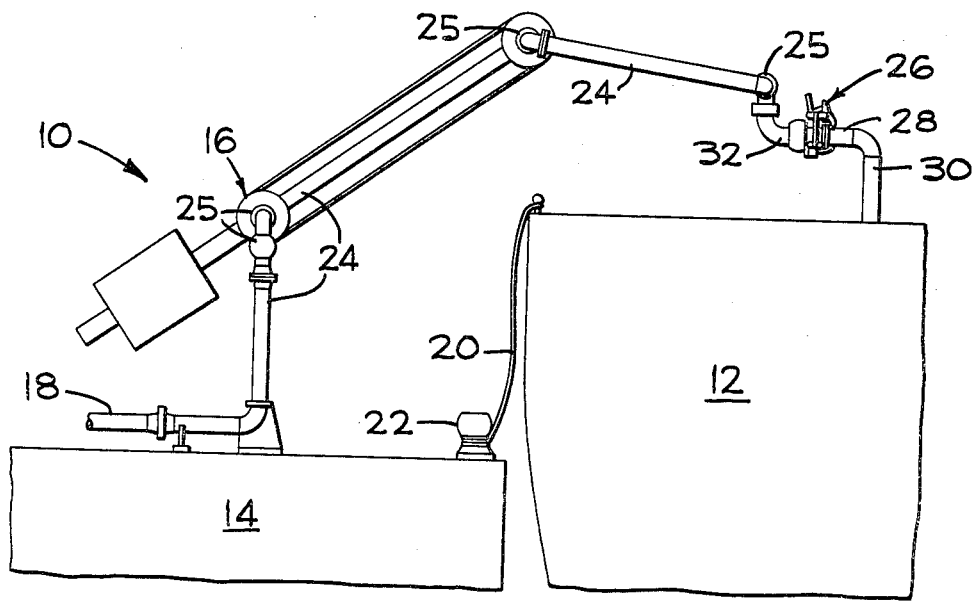
FIG_1
FIG_2
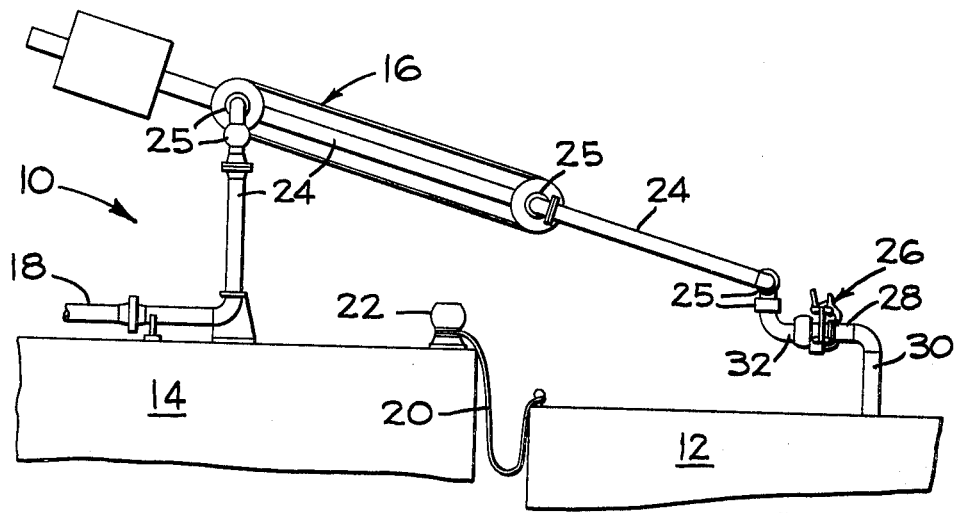
INVENTOR.
FRANK HALEY
BY
Francis W. Anderson
ATTORNEY

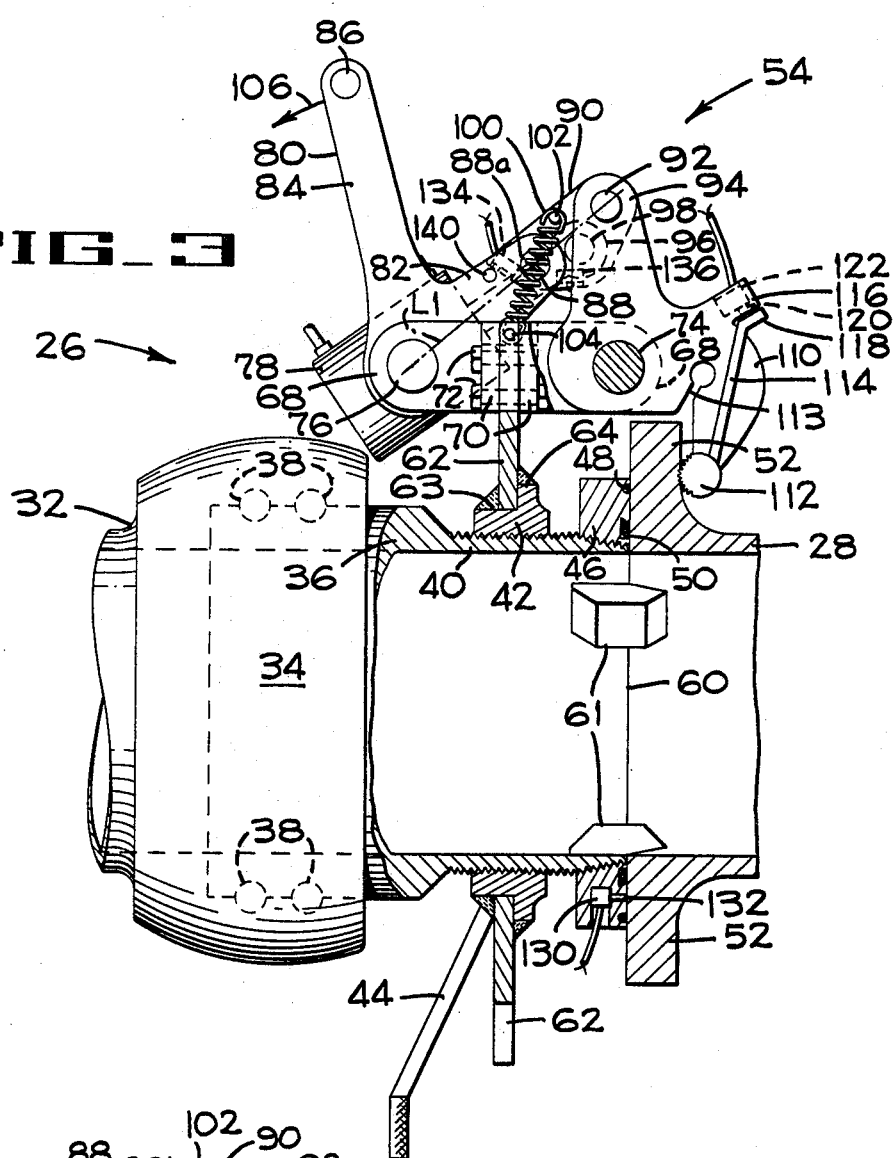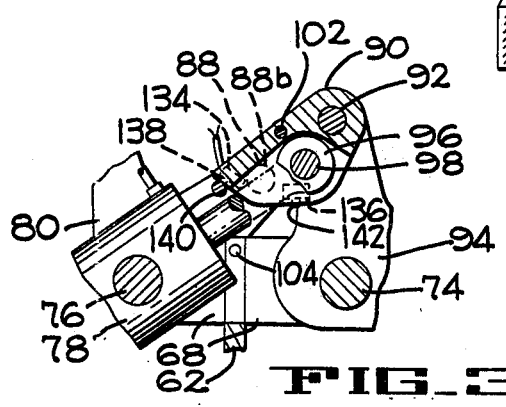

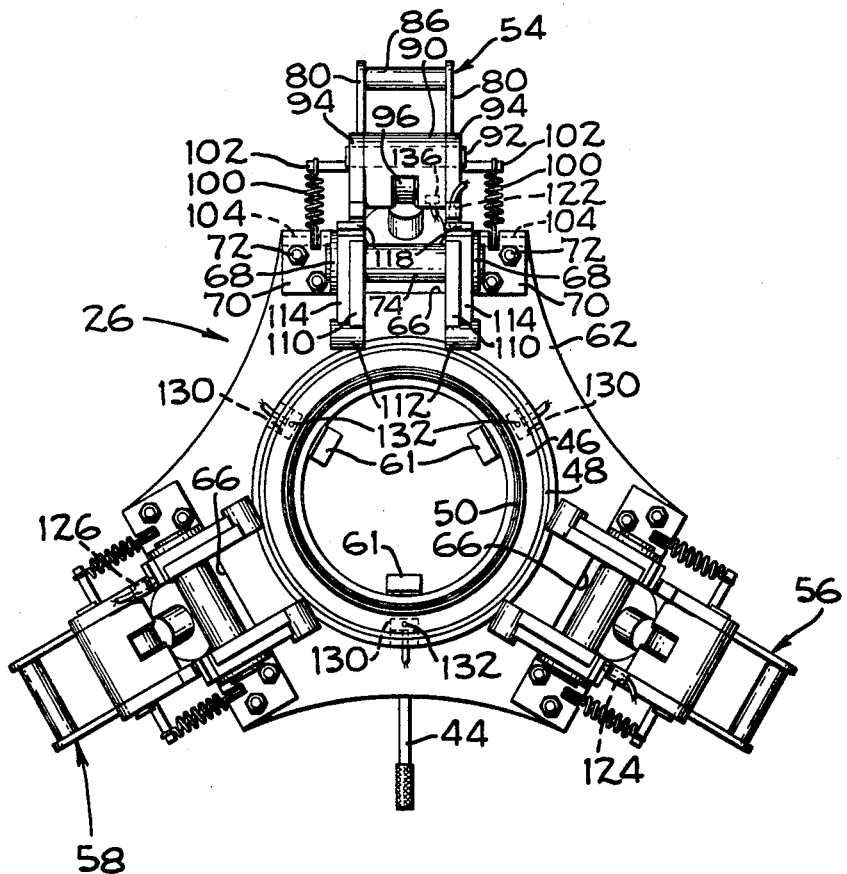

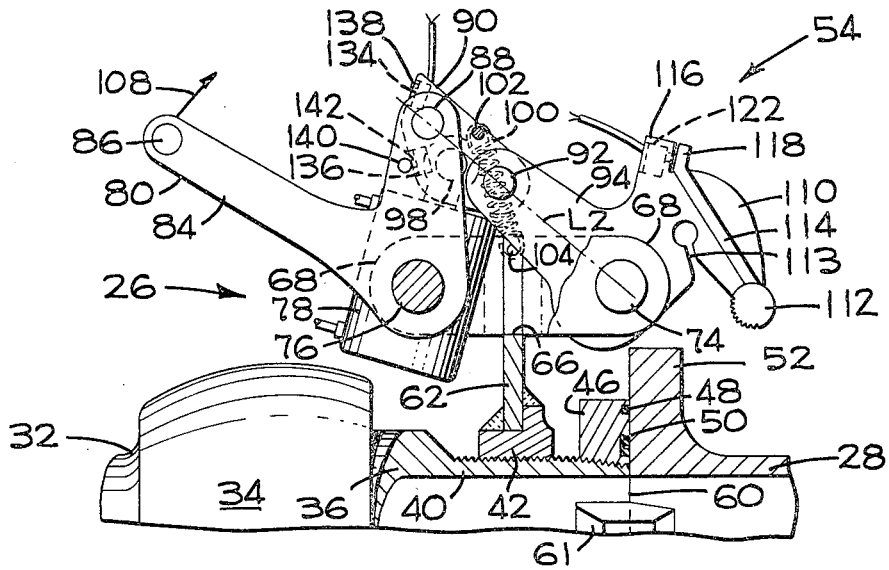
FIG_5
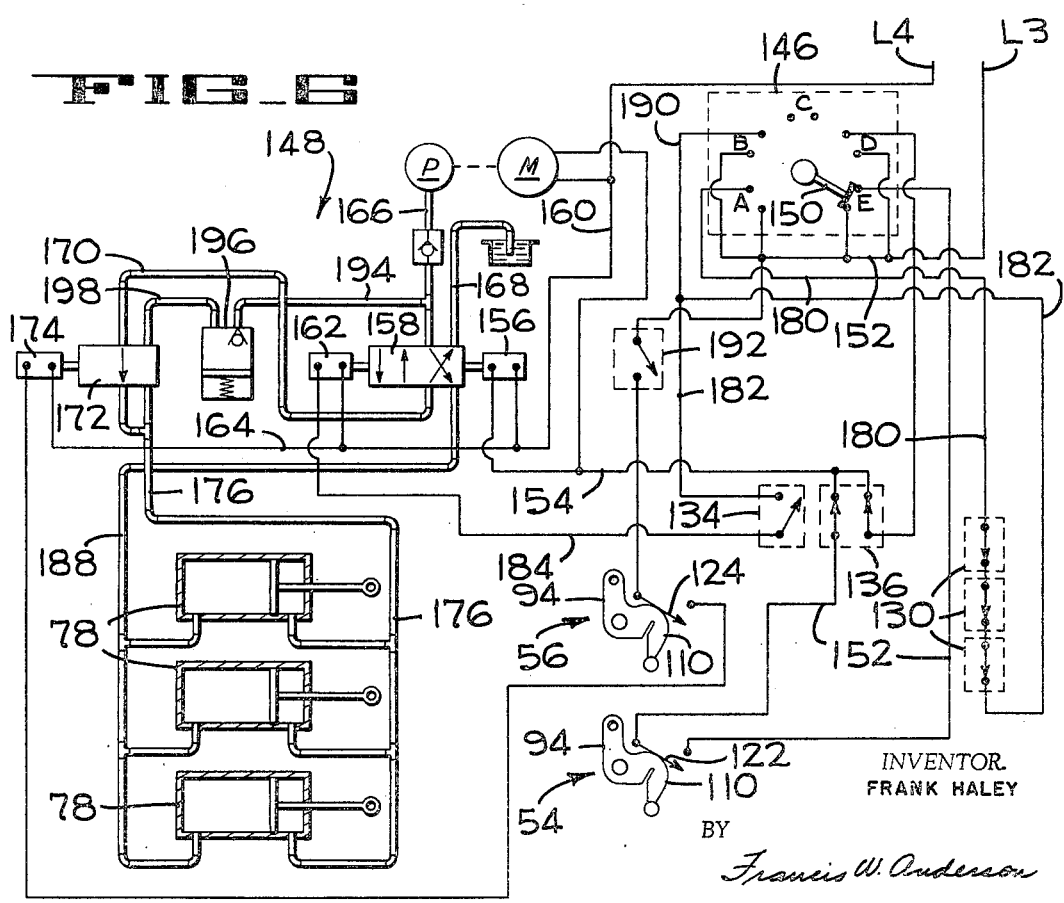
FIG_6
INVENTOR.
FRANK HALEY
BY
Francis W. Anderson
ATTORNEY

United States Patent Office 3,489,434
Patented Jan. 13, 1970

3,489,434
PIPE COUPLING
Frank Haley, 409 W. 9th St.,
Upland, Calif. 91786
Filed Sept. 26, 1966, Ser. No. 582,035
Int. Cl. F16l 35/00, 37/00, 55/00
U.S. Cl. 285—1                                10 Claims

ABSTRACT OF THE DISCLOSURE

A power actuated coupling is provided with clamps mounted on an annular spring plate which flexes when the clamps grip the pipe flange of a conduit. The clamps lock over center and the flexed spring plate thus provides clamping pressure. Each clamp includes an arm arranged to flex when in clamping position, and a force sensing mechanism for sensing additional flexure if the coupling tends to separate from the pipe flange. A control circuit provides for various optional functions such as remote power-actuation of the coupling and automatic uncoupling governed by the force sensing mechanism.

---

The present invention concerns couplings for flanged pipe sections, and more particularly relates to power operated couplings capable of being rapidly and automatically connected and disconnected.

More specifically, the pipe coupling of the present invention is especially useful in various types of known marine loading arms which usually comprise an assembly of articulated pipe sections carrying a flanged end connector. The loading arm may be mounted on and manipulated from a dock for bolted connection of the flanged end connector to a similar flanged connector on the manifold of a tank vessel, following which liquid cargo may be transferred to or from the vessel as required.

In the case of petroleum products, even the escape of a relatively small amount of fluid can present a serious fire hazard, and/or contaminate the water of the harbor, as well as cause monetary loss of the product and the expense and inconvenience of retrieving the same. One manner in which such loss can and does occur is by movement of the vessel, after the loading arm has been coupled to the dock, due to unexpected or unplanned-for wind, tide or wave motion which causes the intervening space between the vessel and the dock to exceed the reach of the loading arm. Also, changes in the level of the deck of the ship during a loading operation often cause the hawser, which connects the ship to the dock, to become slack and permits the ship to drift away from the dock. The pivotal arms can then of the loading arm become fully extended and since the bolted, flanged connection of the loading arm to the manifold is unyielding, one of the pipe sections or swivels of the loading arm will break, and the product escapes. The pumping station may be at a location very remote from the vessel, and the pumping rate is usually very high in order to minimize the time required for loading or unloading. Consequently, even though the whole operation might be under constant supervision, it is possible that uncoupling of the loading arm cannot be effected before an emergency arises, and it is probable that breakage of the loading arm will cause many hundreds of gallons of petroleum to escape before the pumping station can be notified and the pumps stopped.

The present invention includes quick-disconnect boltless coupling means for the flanged pipe connections of a marine loading arm and the manifold of a tank vessel, and provides force sensing means which maintain constant surveillance of any forces tending to misalign or separate the coupled connection. The force sensing means are operable, if the forces exceed predetermined limits, to actuate any number of control circuits governing corrective action, such as the sounding of alarms, deenergizing the pumps and closing mechanically actuated valves, or to effect an automatic uncoupling of the loading arm from the manifold. The coupling means further includes over-center power-actuated locking clamps mounted on an annular spring plate to provide clamping pressure when power is removed from the clamps.

Accordingly, it is an object of the present invention to provide an improved quick-disconnect coupling for a pipeline.

Another object is to provide a mechanism for automatically disconnecting the members of a coupling when a predetermined force applied to the coupling tends to displace the members of the coupling.

Another object is to provide an improved control system for a pipeline.

Another object is to provide an improved motion sensing mechanism for a coupling.

Other and further objects and advantages will be apparent from the following description taken in connection with the accompanying drawings, in which;

FIGURES 1 and 2 are diagrammatic side elevations showing two positions of a marine loading arm installation in which the coupling of the present invention is incorporated.

FIGURE 3 is an enlarged fragmentary side elevation of the coupling of FIG. 1 with parts broken away to disclose internal structure; the coupling being shown in a closed position.

FIGURE 3A is an enlarged sectional view of a portion of the coupling of FIG. 3.

FIGURE 4 is an enlarged end elevation of the coupling of FIG. 3.

FIGURE 5 is a fragmentary side elevation, similar to FIG. 3 but showing the coupling in an open position.

FIGURE 6 is a schematic diagram of the control mechanism of the present invention.

A dock installation 10 (FIGS. 1 and 2) for transferring liquid cargo such as petroleum to or from the tanks of a ship 12 may include a dock 14, at the edge of which is mounted a row of marine loading arms 16, only one arm of which is shown. In the present instance, the ship 12 is shown in an empty condition in FIGURE 1, and fully loaded in FIGURE 2, and the cargo may be moved through a pipe 18 by remote, shore based pumps, not shown. It will be understood that FIGURES 1 and 2 are of a diagrammatic nature to more clearly illustrate some of the problems to which the present invention is directed, and do not necessarily depict actual structural dimensions.

The vessel is made fast by a hawser 20 to a bollard 22, and other hawsers and bollards, after which the loading arm 16 is maneuvered to achieve relative angular motion between its pipe sections 24 and its pivotal interconnections at 25, such that its end coupling assembly 26 is aligned with and can be connected to a flanged pipe section 28 of the ship's manifold 30. In most prior loading arm devices, the interconnection is by means of bolts extending through a pipe flange of the end coupling assembly and the flange of the pipe section 28. Both the coupling and the uncoupling operations in bolted assemblies obviously require a relatively long time.

As the ship is loaded, its freeboard diminishes so that it is lowered relative to the dock 14. This causes the pipe sections of the loading arm to assume a more lineal alignment, and the hawser 20 to become more slack. If the slack hawser is not tightened, the vessel can drift away from the dock and break the loading arm, thus causing the loss of a large amount of petroleum until the pumps can be stopped. The present invention provides the end coupling 26 wherein predetermined forces tending to separate or misalign the coupled connection actuate control circuits to deenergize the pump, disconnect all electric power in the area, and carry out additional precautionary measures to safeguard against fire and mechanical damage to the loading arm.

With more specific reference to the drawings, FIGURES 3 and 4 illustrate the end coupling assembly 26 for the loading arm 16. FIGURE 3 shows the coupling assembly secured to the pipe section 28 of the vessel's manifold, and includes a 90 degree swivel joint and elbow 32 (FIGS. 1 and 2) which forms the last conduit section of the loading arm. The swivel joint 32 (FIG. 3) has a hollow outer housing section 34, a tubular inner section 36, and interposed ball bearings 38 which lie in complementary bearing races, not shown, of the sections 34 and 36.

The swivel joint section 36 is provided with an exteriorly threaded tubular neck 40 that adjustably supports an interiorly threaded rotatable annulus or clamp carrier 42. A handle 44 is secured to and projects from the annulus to facilitate its rotation and consequent axial movement along the threaded neck 40. A flange ring 46 is threaded onto the free end of the tubular neck 40 and carries an O-ring sealing annulus 48 and a generally U-shaped sealing annulus 50 in appropriate end grooves of its outer face. No bolt holes are provided or are necessary in the flange ring 46. The annuli 48 and 50 are deformed into sealing relation with the confronting flange faces of the flange ring 46 and a flange 52 of the pipe section 28, by three hydraulically powered clamp assemblies 54, 56 and 58 (FIGS. 3 and 4) to form a radial sealing interface 60 therebetween. A plurality of outwardly projecting guide lugs 61 are secured to the end portion of the tubular neck 40 and have inclined surfaces that facilitate end to end alignment of the conduit sections formed by the neck and the pipe section 28, so that the flange ring 46 and flange 52 are substantially in coaxial alignment prior to actuation of the clamp assemblies 54, 56 and 58.

The three clamp assemblies are substantially identical, except for minor differences later pointed out. Thus, a description of the clamp assembly 54 (FIGS. 3 and 5) will serve to disclose the clamp assemblies 56 and 58. Projecting radially outward from the axially adjustable clamp carrier 42 is a flat spring steel ring 62, of tricornered shape, which has an inner portion which circumscribes and is welded both to an outer surface at 63 of the carrier 42, and to a radial flange 64 of the carrier. Equiangularly disposed outwardly open slots 66 (FIG. 4) are provided in each corner of the spring 62 to accommodate the associated clamp 54, 56 or 58.

The side walls of the slots 66 are not visible, but coincide with the inner surfaces of two axially extending, angle bracket mounting ears 68. Each ear has an integral, outwardly turned flange 70 that is held by bolts 72 to an end wall of the spring 62. Considering the clamp assembly 54 (FIG. 3), the pair of mounting ears 68 which project away from the loading arm and toward the ship's manifold connection journal a pivot shaft 74, and the opposed pair of mounting ears 68 journal aligned stub shafts 76 (only one of which is shown) that are integral with a double-acting hydraulic cylinder 78. A toggle link 80 is mounted on the stub shaft 76 at each side of the hydraulic cylinder 78, between the mounting ear 68 and the cylinder 78. Each link includes a first toggle arm 82 and a handle arm 84. The arms 84 are interconnected by a rod 86 which forms a handgrip.

A first toggle shaft 88, which consists of two axially spaced stub shafts 88a, connects the toggle link 80 to a center link 90, each stub shaft pivotally connecting one of the toggle arms to the link 90. A second toggle shaft 92 extends through another portion of the center link 90, and through a spaced pair of second toggle arms 94 which lie in the same planes as the first mentioned toggle arms 82 and are mounted upon the pivot shaft 74. The center link 90 (FIG. 3A) is longitudinally slotted to clear a clevis 96 which is mounted on the piston rod of the hydraulic cylinder 78 and is connected to the center link 90 by a clevis pin 98.

An over-center spring 100 is anchored to each end of a pin 102 which projects from the center link 90, and each spring is connected to pin 104 which extends outwardly from each side of the slot 66 (FIG. 4) through the spring 62. A slot, as clearly shown in FIGURE 4, is milled through the outer edge of the flange 70 and the spring 62 for reception of the looped end of the spring 100.

When the piston rod of the hydraulic cylinder 78 (FIG. 3) is fully extended, the axis of the toggle shaft 88 lies below an imaginary line L1 interconnecting the axes of the shaft 92 and the stub shafts 76. Accordingly, the toggle arms 94 cannot be pivoted counterclockwise, but the toggle links 80 can be moved in the direction of the arrow 106 by manually pulling the handgrip 86 in the same direction. Conversely, if the piston rod of the hydraulic cylinder 78 is in the FIGURE 5 retracted position, the axis of the toggle shaft 92 lies below an imaginary line L2 interconnecting the axes of the shaft 88 and the stub shafts 74, so that the handgrip 86 cannot be moved in the direction of the arrow 108. This toggle action thus assures that the clamp assembly 54 can be manually moved from its FIGURE 3 to FIGURE 5 position, but movement of the clamp assembly from the FIGURE 5 to FIGURE 3 position can only be effected by the hydraulic cylinder 78.

Each of the previously mentioned toggle arms 94 is associated with a force sensing arm 110 which can flex in a plane perpendicular to the axis of the pivot shaft 74 and has a gripper foot 112 that is arranged to bear inwardly against the flange 52 of the pipe section 28 when the end coupling assembly 26 is in its FIGURE 3, coupling position. To enable a predetermination of the amount of flexure which will occur when the pipe section 28 is thus gripped, each force sensing arm 110 is provided with a slotted portion at 113, the dimension of which determines the amount the arm 110 will flex outward under a predetermined force tending to separate the flange ring 46 from the flange 52.

A rigid torque arm 114 is welded to each gripper foot 112, extends upwardly toward a boss 116 on the associated force sensing arm 110, and has an inwardly extending saddle portion 118 (FIG. 4) which on one arm 110 is aligned with a switch plunger 120 (FIG. 3). It will be seen that a force tending to separate the flange ring 46 from the flange 52 will cause the force sensing arms 110 to flex away from the axis of the pivot shafts 74, and in so doing, will cause the saddle 118 of the torque arms 114 to move inwardly toward the bosses 116. In the case of the switch plunger 120 (FIG. 3) of the clamp 54, an associated force sensing electrical switch 122 will be actuated. A similar switch 124 (FIG. 4) is associated with the force sensing arm 110 for the clamp assembly 56. If so desired, another switch 126 can be associated with the clamp assembly 58.

Operating in conjunction with the switches 122, 124 and 126, and the FIGURE 6 control circuit yet to be described, are three flange switches 130 (FIGS. 3–6) which have normally open single pole, single throw contacts and actuating plungers 132 that project from the flange ring 46 and are thus depressed when the flange 52 is gripped by the clamp assemblies 54, 56 and 58 against the flange ring 46. Also operating in conjunction with the electrical switches, above mentioned, are center link position switches 134 and 136 (FIGS. 3A, 5 and 6), the former of which can be single pole, single throw type, and the other of which may be a double pole, single throw type.

The center link switch 134 (FIG. 3A) is mounted in a recess of the center link 90 and has an actuator 138 which is arranged to be depressed by a stop pin 140. The stop pin extends through the toggle arms 82 and actuates the switch 134. The pin 140 also limits movement of the center link 90 when the piston rod of the hydraulic cylinder 78 is fully extended to move the gripper foot 112 from its FIGURE 5 open position to its FIGURE 3 closed position. The center link switch 136 has an actuator 142 which is arranged to be depressed when the piston rod of the hydraulic cylinder 78 is fully retracted, as shown in FIGURE 5. If the flanges 52 and 46 are separated, the contacts of one or more of the flange switches 130 are opened.

Before considering the electrical and hydraulic control circuit of FIGURE 6, it should be noted that the force sensing switches 122 in the force sensing arms 110 are adjustably mounted so that their plungers 120 can be positioned with a predetermined clearance from the torque arm saddles 118 (FIG. 4). Since the force required to flex the spring plate 62 is a known quantity, it can readily be ascertained that a certain plunger clearance is necessary to sense the point at which any given force tending to separate the coupling flanges 46 and 52 is exceeded. The axial adjustment of the spring plate, by rotating the spring plate by means of the handle 44, and the known energizing pressure for the hydraulic cylinders 78 will determine the spring force to be overcome before the force sensing switches 122 are actuated.

The control circuit of FIGURE 6 is governed by a mode selector switch 146 which, with a hydraulic circuit indicated generally at 148, can be based on shore adjacent the loading arms 16, at a control tower for the operator of the loading arms, or at the remote pumping station. In any event, the control circuit is connected to the various switches associated with the loading arms by an electrical cable, not shown, which may be secured to the loading arm or independent thereof. A mode selector arm 150 of the switch 146 is arranged to be set at one of five possible positions A, B, C, D, or E, which respectively correspond to clamping functions identified as Automatic Closing, Manual Closing, Off, Manual Opening and Automatic Opening. In the present instances, since the clamp assembly 58 has no force sensing switch similar to switches 122 and 124 of clamps 54 and 56, no force sensing switch for clamp 58 appears in the control diagram.

As shown in FIGURE 6, the clamp assemblies 54 and 56 are in their FIGURE 3 clamping positions, and the selector arm 150 of the mode selector switch 146 is positioned to effect Automatic Opening of the clamps if a flange separating force occurs in excess of the predetermined force which will actuate the force sensing switches 122 and 124. The E position switch contacts are in series with a line 152, that is connected to a power input line L3, as are the contacts of the force sensing switch 122 of the clamp assembly 54. Normally closed contacts of the toggle sensing switch 136 are connected to the line 152 and to a line 154 which is secured to one terminal of a solenoid 156 that is arranged, when energized, to shift the core of a solenoid operated hydraulic valve 158 to the right. The other terminal of the solenoid 156 is connected to a power input line L4 by a line 160. A similar solenoid 162 at the other end of the valve 158 is connected to line L4 by a line 164 and is arranged when energized to shift the core of the valve 158 to the left.

If the force sensing switch 122 is closed by tension or misalignment forces on the clamped connection of the flange ring 46 and the ship flange 52, the solenoid 156 will be energized and align the straight passages of the valve 158 with a hydraulic input conduit 166 and a hydraulic return conduit 168, whereby hydraulic fluid from a pump P, driven by a motor M, is fed through a conduit 170. Conduit 170 is connected to a valve 172 which is operated by a solenoid 174. In the present instance, the solenoid 174 is deenergized and the valve 172 transmits the hydraulic fluid into a conduit 176 that is connected to the piston rod end of each of the hydraulic clamp cylinders 78. The piston rods are thus simultaneously retracted, and each clamp assembly 54, 56 and 58 is opened to the position illustrated in FIGURE 5 for the clamp assembly 54.

It should be mentioned at this point that the force sensing switch 122 which initiated the clamp opening action can be additionally used to actuate a remote relay to stop the pump which is transferring fluid through the loading arm 16. Also, it will be evident that other force sensing switches operating in the same manner as the force sensing switch 122 can be mounted for actuation by those torque arms 114 (FIG. 4) which are not in the present example associated with any switch. Thus, it is possible, and under some conditions desirable, to employ these additional switches to actuate further control circuits such as an audible alarm, a main disconnect which will shut off all electrical power in the area, or such other circuits as may be required. It should be noted too that these additional switches can be mounted with different clearances between their plungers and torque arms so that they can be sequentially actuated. Thus, a low flange-separating force might be sensed to initially sound an alarm, a higher force could actuate another switch to shut down the main pump, and a yet higher force could effect automatic separation of the flanged connection in the manner described.

When it is desired to connect the loading arm to the pipe section on the ship, the selector arm 150 is moved to the A position before the end coupling assembly 26 is connected to the pipe section 28 of the ship's manifold. Then, when the control circuit is actuated, the clamp assemblies 54, 56 and 58 will automatically clamp the flange ring 46 to the flange 52. The flange switches 130 are normally open, are in series with each other in a line 180, and are in series with the A position contacts. Power is thus fed from the power input line L3, through lines 152 and 180, and through the flange switches 130 when the flange ring 46 abuts the flange 52. Beyond the flange switches the power is transmitted through a line 182 to the toggle sensing switch 134. This switch is closed because the clamp assemblies 54, 56 and 58 are in an open condition, as shown in FIGURE 5. A line 184 connects the switch 134 to the solenoid 162 of the valve 158, whereby the crossed passages of the valve are in communication with the conduits 166 and 168. Fluid under pressure is thus transmitted through a conduit 188 into the base of each of the hydraulic clamp cylinders 78, whereby the clamp assemblies 54, 56 and 58 simultaneously close to their gripping position shown in FIGURE 3 for the clamp assembly 54.

The B position of the selector switch 146 is useful when the coupling is opened and it is desired to have manually initiated, powered closing of the clamp assemblies 54, 56 and 58. Thus, the flange switches 130 are bypassed when the selector switch is in the B position by energizing a line 190, which, in conjunction with the normally closed toggle sensing switch 134, energizes the solenoid 162 in the manner already described to power the hydraulic cylinder 78 in a direction closing the clamp assemblies 54, 56 and 58.

The D position of the selector switch 146 is useful when the coupling is closed and it is necessary to have manually initiated, powered opening of the clamp assemblies 54, 56 and 58. Accordingly, if the operator positions the selector switch in the D position while the clamp assemblies are closed, the contacts of the toggle sensing switch 136 are closed and electrical power is transmitted to the solenoid 156 of the valve 158. The straight valve passages thus transmit hydraulic fluid in the same manner described in connection with the E position of the selector switch, and the cylinders 78 are energized to open the clamp assemblies 54, 56 and 58 to the position shown in FIGURE 5 for the clamp assembly 54.

The solenoid operated valve 172 has its solenoid 174 in series connection between the power input lines L3 and L4 through the force sensing switch 124, an emergency button switch 192, and the contacts at the A position of the selector switch 146. Thus, if the A or automatic closing position is in use and it is suspected that a tension force has developed which is sufficient to close the normally open contacts of the force sensing switch 124, the operator can depress the emergency button switch 192. This switch can be mounted on the end coupling assembly 26 for convenient access by a person supervising the flange clamping operation. If the contacts of the force sensing switch 124 are in fact closed, the solenoid 174 shifts the valve 172 so that communication is established between a conduit 194 and the conduit 176 through an interposed hydraulic accumulator 196 and a conduit 198. During operation of the pump P, hydraulic fluid is pumped into the accumulator 196 to displace a spring biased piston therein. Thus, hydraulic fluid can be forced by the pump through the accumulator to simultaneously energize the hydraulic cylinders 78 to open the clamp assemblies 54, 56 and 58. If the pump should fail during the previously described operation, the spring-biased piston of the accumulator 196 will force fluid into the conduit 198 to open the clamp assemblies.

If the electric power should fail, the clamp assemblies 54, 56 and 58 can be manually opened by pulling the handgrips 86.

Although the best mode contemplated for carrying out the present invention has been herein shown and described, it will be apparent that modification and variation may be made without departing from what is regarded to be the subject matter of the invention.

What is claimed is:

1. A pipe coupling comprising a coupling member having a planar end face, a spring plate encircling said coupling and secured thereto, clamp means mounted on said spring plate, means for actuating said clamp means to grip the flanged end of a pipe against said planar end face and thereby deflect said spring, said clamp means including a clamp arm for gripping the flanged pipe end, said clamp arm including a relatively rigid portion and a resilient portion which is initially deflected relative to said rigid portion upon actuation of said clamp actuating means into gripping relation with said flanged pipe end, and torque sensing means carried by said clamp arm for sensing additional deflection of said resilient arm portion caused by axial separation of said flanged pipe end and said planar end face.

2. A pipe coupling comprising a coupling member having a planar end face, a spring plate encircling said coupling and secured thereto, clamp means mounted on said spring plate, means or actuating said clamp means to grip the flanged end of a pipe against said planar end face and thereby deflect said spring, said clamp means including a force sensing arm having a resilient portion for gripping the flanged pipe end and another portion rigid relative to said resilient portion, and sensing means mounted on said arm for detecting relative movement between said rigid and resilient arm portions caused by axial separation of said flanged pipe end and said planar end face.

3. Apparatus according to claim 2 wherein said coupling member defines a tubular bore, and guide lugs mounted on the surface defining said bore and projecting axially beyond said planar end face to facilitate alignment of said coupling member and said flanged pipe end.

4. A pipe coupling comprising an exteriorly threaded tubular member having a planar end face arranged to abut the confronting face of a flanged pipe section, an interiorly threaded annulus engaged with the threads of said tubular member, a spring plate circumscribing said annulus and rigidly secured thereto, and a plurality of clamps mounted on said spring plate, each clamp including a pivotally mounted clamp arm movable between a closed clamping position, in which the free end of the arm is spaced axially of said tubular member from said planar face to clamp said flanged pipe section against said planar face to an open unclamping position remote therefrom to allow separation of said flanged pipe section from said planar end face, toggle linkage means connected to said arm, power means for actuating said toggle linkage to move said clamp arm between said open and closed positions, and manually operable linkage means connected to said toggle linkage means and arranged to override said power means and move said clamp arm from said clamping position to said unclamping position.

5. A pipe coupling comprising a conduit member having a planar end surface, a flexibly resilient support ring encircling said conduit member and secured thereto and spaced axially from said planar end surface, and a plurality of clamp units mounted on said ring, each unit having a clamp arm arranged to be moved into spring-loaded engagement with a flanged end of a pipe to lock the pipe against the planar end surface of said conduit member, said spring loaded engagement resulting from flexure of said support ring in an axial direction.

6. A pipe coupling according to claim 5 including power means for moving said clamp arms away from the face of the conduit.

7. A pipe coupling according to claim 6 including control means responsive to a predetermined amount of movement of the flange away from the end of the conduit for actuating said power means to move said arms away from the flange.

8. A pipe coupling according to claim 7 wherein said control means includes at least one sensing switch arranged to be preconditioned when the flange is pressed against the conduit end surface by said clamping arms.

9. A pipe coupling according to claim 5 wherein said clamp units include over-center linkages arranged to be moved to over-center position when said clamping arms are holding the flanged end of the pipe in clamped position against the end of the conduit and also when said arms are spaced from the conduit end in unclamped position.

10. A pipe coupling according to claim 7 wherein said movement sensing control means comprises a resilient end portion of at least one of said clamp arms and a switch-actuator secured to the outer end of the clamp arm and movable therewith as said end flexes.

References Cited

UNITED STATES PATENTS

| 1,493,221 | 5/1924 | Northrup | 285—311 X |
| 1,910,706 | 5/1933 | Malzard | 285—320 X |
| 1,991,343 | 2/1935 | Ball | 285—311 X |
| 2,634,926 | 4/1953 | Worlidge. | |
| 3,052,299 | 9/1962 | Geer et al. | 285—18 X |
| 3,126,213 | 3/1964 | Lewis | 285—364 X |

FOREIGN PATENTS

| 854,763 | 11/1960 | Great Britain. |

DAVID J. WILLIAMOWSKY, Primary Examiner

D. W. AROLA, Assistant Examiner

U.S. Cl. X.R.

285—27, 311, 320, 364, 420; 24—248